UNITED STATES PATENT OFFICE.

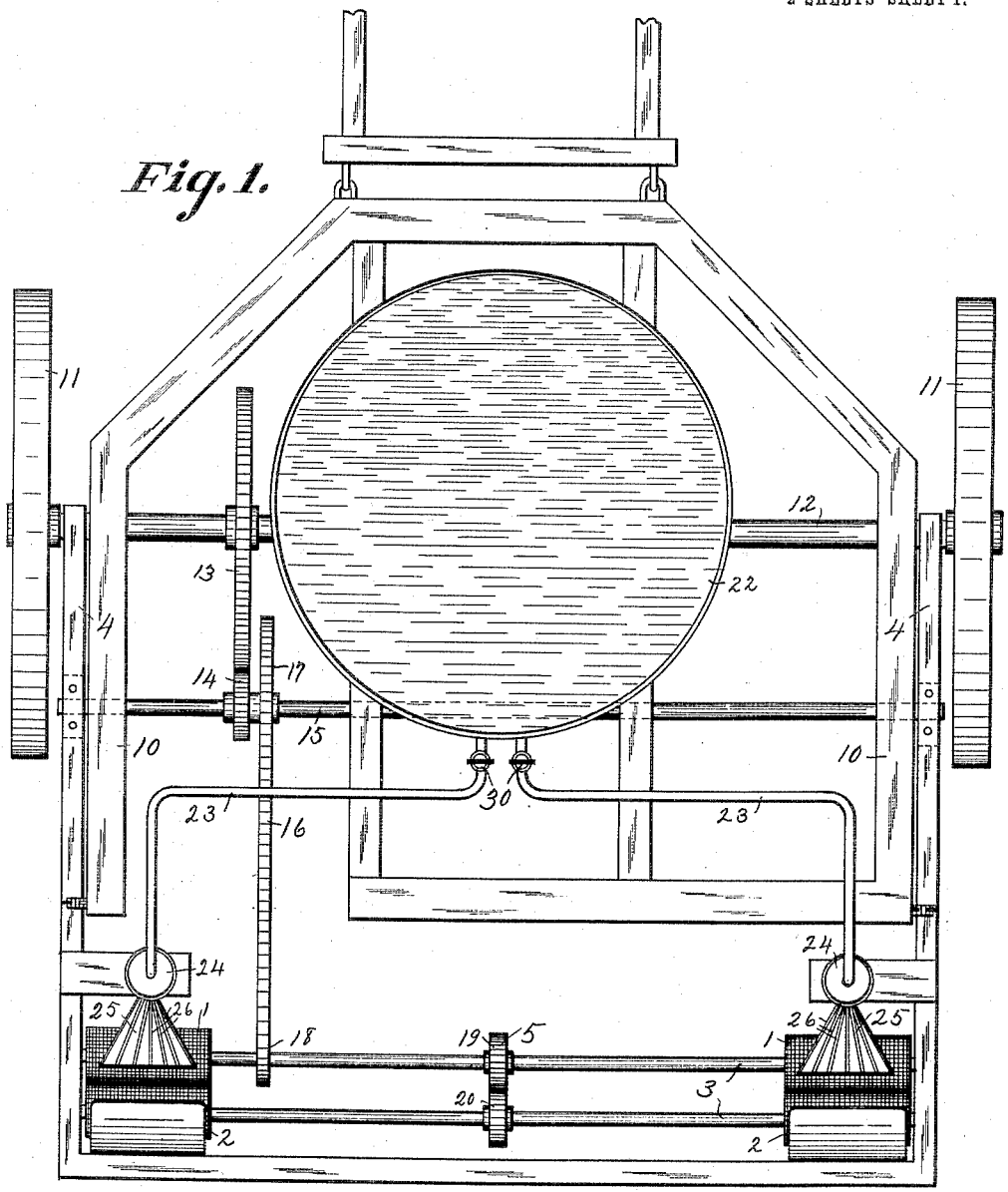

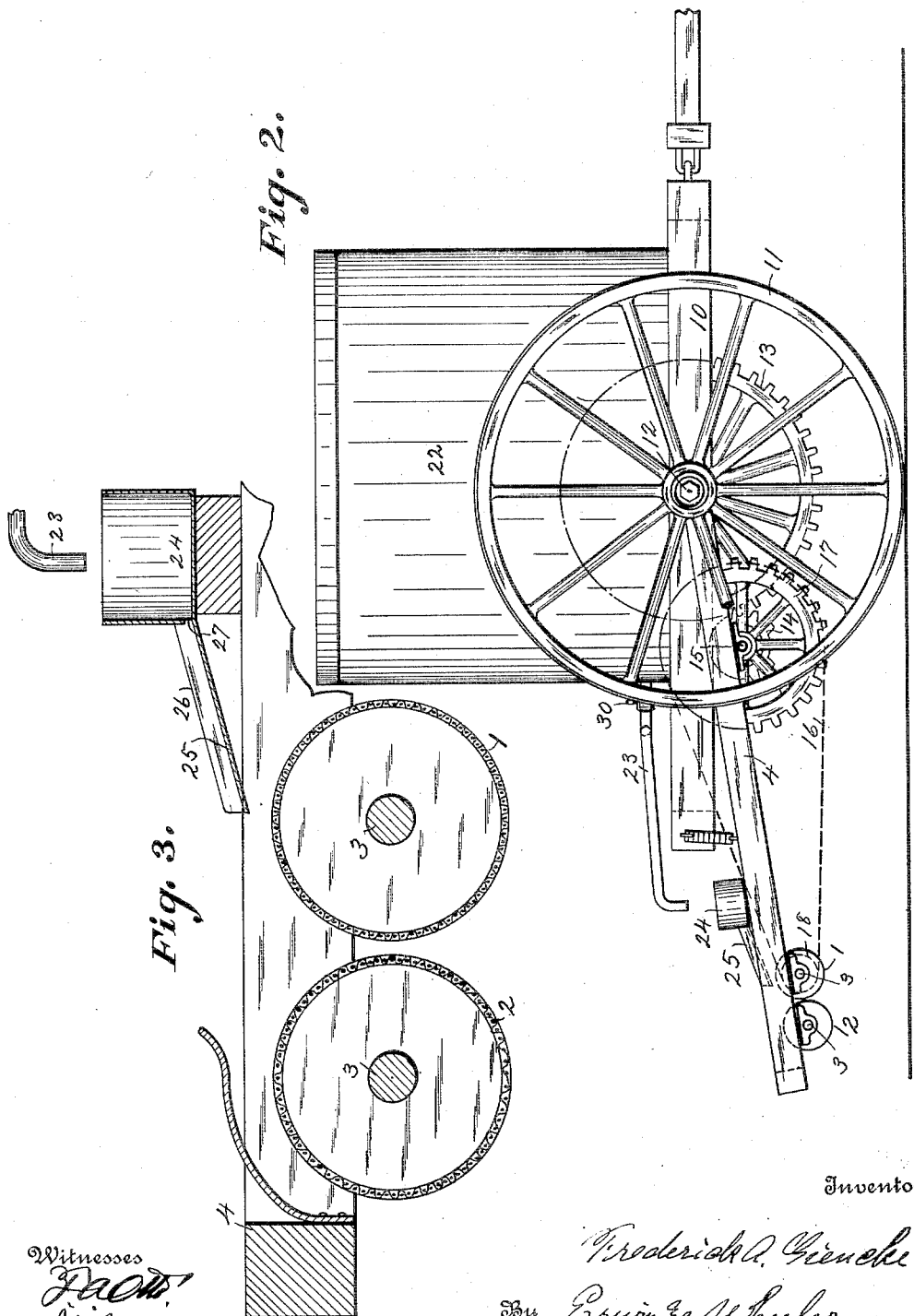

FREDERICK A. GIENCKE, OF BROOKFIELD, WISCONSIN, ASSIGNOR OF ONE-HALF TO GEORGE REINDERS, OF BROOKFIELD, WISCONSIN.

DISTRIBUTING APPARATUS FOR LIQUIDS.

1,076,880.  Specification of Letters Patent.  Patented Oct. 28, 1913.

Application filed March 7, 1912. Serial No. 682,199.

*To all whom it may concern:*

Be it known that I, FREDERICK A. GIENCKE, a citizen of the United States, residing at Brookfield, county of Waukesha, and State of Wisconsin, have invented new and useful Improvements in Distributing Apparatus for Liquids, of which the following is a specification.

My invention relates to improvements in distributing apparatus for liquids, with particular reference to poison distributing apparatus for plants.

The object of my invention is to provide means whereby liquid poison may be more thoroughly distributed to the leaves of plants than in the devices heretofore employed.

The usual practice is to either spray liquid poison upon the plants through a spray nozzle, or to distribute it to the plants by means of brushes, in either dry or liquid form. The use of atomizers is impractical and the ordinary spray nozzles and brushes deliver the liquid in drops of considerable size, or in splashes, resulting in an unequal distribution and considerable waste. I have discovered that by employing rotary drums having netted peripheries driven at a comparatively high speed, the drops of liquid may be broken up into much smaller particles than when delivered by means of brushes, the results secured being more nearly similar to those secured by means of an atomizer, and with a better distribution owing to the absence of the strong blast required for delivery through an atomizer. I have further discovered that a rotary netted drum is more durable than a brush which either rotates or vibrates for the delivery of the liquid.

In the drawings Figure 1 is a plan view of a wheeled vehicle embodying my invention. Fig. 2 is a side elevation of the same. Fig. 3 is a detail view, showing the rotary drums in cross section, together with a portion of the supply connections and of the vehicle frame.

Like parts are identified by the same reference characters throughout the several views.

A pair of rotary drums 1 and 2 are supported by horizontal shafts 3 from a frame 4. The drums 1 and 2 have their cylindrical walls formed of fine mesh wire nets and are supported in proximity to each other, being preferably located only about one-half inch apart. The shafts 3 are connected by suitable gear wheels 5 (Fig. 1), whereby the drums are required to rotate in opposite directions. In the construction shown, the frame 4 is pivoted to axle 12 and is vertically adjustable independently of the main frame 10, which is also mounted upon the axle 12. The axle 12 rotates and its motion is communicated to one of the shafts 3 through gear wheels 13 and 14, shaft 15 and sprocket chain 16, the latter running over sprocket wheels 17 and 18 on shaft 15 and the forward shaft 3 respectively. From the forward shaft 3, motion is communicated to the rear shaft 3 through gear wheels 19 and 20. With this construction, the forward movement of the vehicle causes the drums to rotate and the arrangement is such that the drums will rotate downwardly in the space between the shafts 3, and will be driven at a considerably higher speed than the wheels 11. I preferably drive the drums at a rate of about forty to forty-five revolutions for each revolution of the traction wheel.

The frame 10 carries a tank 22, for poisonous liquid. From this tank the liquid may be delivered to the drums through one or more pipes 23, chamber 24, and an inclined distributing shield 25. This distributing shield 25 is preferably fan shape and inclined with a wide delivery margin at its lower edge. It is also provided with ribs 26 at intervals to divide the liquid and direct it for delivery across the entire length of said lower margin. The chamber 24 is provided with a series of narrow outlets 27, (Fig. 3), through which the liquid escapes to the distributing shield. The vibration of the vehicle facilitates the distribution of the liquid upon this shield.

The pipe 23 is provided with a valve 30 regulating the flow of liquid therethrough. This pipe is preferably unconnected with the chamber 24, the liquid being allowed to discharge freely into said chamber, whereby a substantially constant head in the chamber 24 may be maintained regardless of the quantity of liquid in the main tank 22. The lower margin of the shield 26 is preferably located above the front rotary drum 1 a little to the rear of the center thereof. The liquid strikes the drum and splashes from it to the other drum and into the space between the drums and also passes through the drums, which, owing to their rapid rotation and the vibration caused by the moving vehicle, break up the liquid into an extremely fine spray and throw it with considerable force downwardly, forwardly and backwardly, the front drum throwing the liquid forwardly and the rear drum throwing it backwardly.

I am aware of the fact that apparatus of a somewhat similar form has been heretofore constructed in which rotary brush cylinders are employed instead of the netted cylinders above described, but the brushes fill with water and throw it not only in drops, but frequently when the vehicle is jolted, large quantities of liquid are shaken out of the brushes, causing a very irregular distribution. The brushes also wear out rapidly. The drums do not wear out and fine mesh nets may be employed, whereby a delivery of liquid in any form except in small particles will be prevented.

I claim—

1. Liquid distributing apparatus comprising the combination with a vehicle, a frame pivoted thereto for vertical adjustment, a set of rotary drums having netted cylindrical walls and supported by said frame with their axes substantially parallel and transverse to the line of vehicle travel, means for revolving said drums in opposite directions and with their upper surfaces, each moving toward the other, and means for supplying liquid to the upper surface of one of said drums, said frame being adapted to support said drums above a row of plants to which the liquid is to be distributed and along which the vehicle moves.

2. The combination with a vehicle, of a set of parallel rotary netted drums supported thereby with their peripheries in close proximity and with their axes extending transversely to the line of vehicle travel, means for delivering liquid to the upper surfaces of one of said drums, and means for rotating said drums in opposite directions and with their upper surfaces each moving toward the other, and at sufficient speed to throw the liquid forwardly and backwardly from their netted surfaces, each of said drums having a cylindrical peripheral wall of fine mesh wire netting, whereby the liquid is permitted to pass through the drums and delivered in an atomized condition to a row of plants along which the vehicle is propelled.

In testimony whereof I affix my signature in the presence of two witnesses.

FREDERICK A. GIENCKE.

Witnesses:

LYMAN G. WHEELER,

I. D. BREMER.